May 22, 1928.
T. F. PEITER
PIN GUARD
Filed June 8, 1927
1,670,982
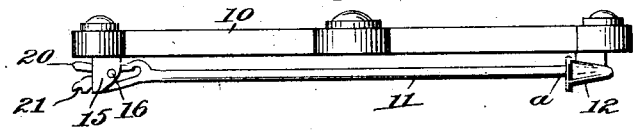
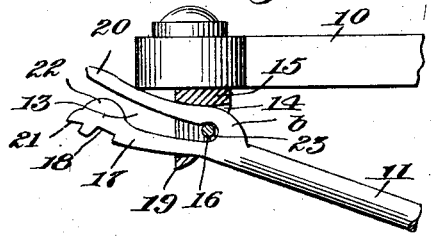
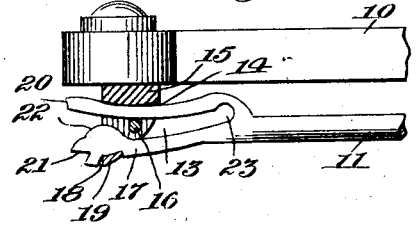
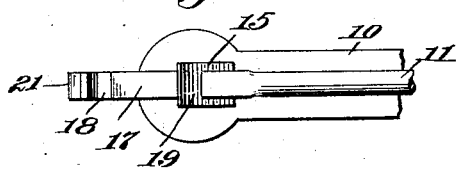
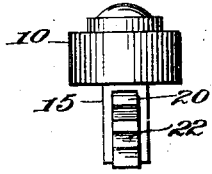
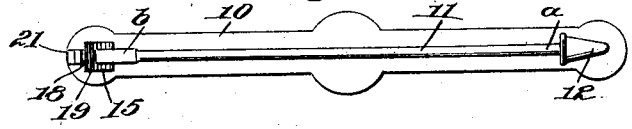
Inventor:
Theodore F. Peiter Patented May 22, 1928.

1,670,982

UNITED STATES PATENT OFFICE.

THEODORE F. PEITER, OF NEWARK, NEW JERSEY.

PIN GUARD.

Application filed June 8, 1927. Serial No. 197,450.

The present invention is a pin fastener or guard of such construction as will lock the pin in operative fastened position so that the same will not become loose or unfastened.

The object of the present invention is the provision of a pin fastener of the above stated character, having a very simple and positive locking mechanism, devoid of numerous small operable parts which are very tedious to operate and relatively expensive to manufacture.

The main feature of the present invention is the provision of a pin fastener or guard where one end of the pin has a pivotal sliding movement with respect to the body member to which it is attached, and the locking means being provided by the pin itself at said point of connection with the body member.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Other purposes and means of the invention, more or less specific than those referred to above, will be in part obvious and in part pointed out in describing the elements, combination and arrangement of parts and application of principles constituting the invention, and the scope of the protection contemplated will be indicated in the appended claims.

Referring in detail to the drawings which show the preferred embodiment of the invention as at present devised:

Figure 1 is a plan view of a brooch or other article equipped with the pin fastener of the present invention.

Fig. 2 is an enlarged fragmentary view similar to Fig. 1 but showing the detail construction of the sliding pivotal connection of the pin and the locking means;

Fig. 3 is a similar view to Fig. 2, but showing the pin in normal locked position.

Fig. 4 is a rear elevation of the device as shown in Fig. 2;

Fig. 5 is an end elevation of the device as shown in Fig. 3; and

Fig. 6 is a view similar to Fig. 2 showing the relation of the parts which prevent the pin from being withdrawn from the brooch.

Referring particularly to the accompanying drawings, 10 denotes a plate or body portion of a brooch, bar pin, button, badge or like device which is to be held in place by a pin member 11. The plate or body member may be of any suitable shape, design or material, as will be readily understood in the art.

The present invention resides in the manner in which the pin 11 is mounted on the body or plate 10, and the manner in which it is held or locked in operative fastening position. The pin 11 usually, and as here shown, is mounted on the rear or back face of body member 10 and its pointed or piercing end $a$ is adapted to enter and extend into a thimble-like keeper element 12. The keeper element 12 is preferably fixedly mounted at one end portion of the body member 10, or is integral therewith.

The other end portion $b$ of the pin 11 has a sliding pivotal connection with the body member 10, so that the piercing end $a$ of the pin may be withdrawn from the thimble-like keeper 12 and withdrawn from the fabric or material through which it extends, or inserted thereinto.

To this end the end $b$ of the pin 11 is, preferably, flattened, and of greater width than the diameter of its body portion. This flattened portion $b$ is bifurcated by a slot 13, extending obliquely to the axis of the pin from the end of the portion $b$ for a substantial distance inwardly. This end $b$ of the pin is inserted in an opening 14 formed in a boss or mounting 15 rigid with the body member 10, the opening being in subtantial alinement with the thimble keeper 12. A retaining pintle 16 extends transversely across the boss 15 and the opening therein to lie within the slot 13, and is of less diameter at the width of the major portion of the slot.

The part 17 of the bifurcation has its outer edge convexed toward its outer end at which point is provided a notch 18 whose side walls are formed to receive the narrow wall 19 of the boss 15 and cooperate therewith to lock the pin in its fixed position as shown in Figs. 1 and 3.

The wall 19 is preferably of narrow dimensions so that it acts as a keeper or lock bar.

The parts 17 and 20 of the bifurcated end b of the pin may have a desired degree of resiliency, and by reason of the bifurcation may be pressed or squeezed together, since the retaining pintle 16 is of less diameter than the width of the slot 13. The outer edges of the bifurcated portions oppose opposite walls, respectively, of the opening 14, and are designed to slide freely between the same for a distance that will permit the end a of the pin to be inserted into the thimble keeper and to be removed therefrom. The outer edge, however, of the bifurcated part 17 is on an outwardly inclined curve which causes said edge to engage the opposing wall of the opening 14 and be compressed to close the bifurcation or slot 13, until the notch 18 has been reached, at which time the notch will receive the wall 19 and lock the pin in effective fastening position, as shown in Fig. 1. The extremity of the part of the bifurcation is provided with a ledge 21 which may be engaged by the finger-nail, or other instrument, to compress the part 20 to remove the notch out of engagement with the wall 19 of the boss.

The outer edge surface of the parts 17 and 20 engage the opposing walls and cooperate therewith, by reason of their shape, to compress the parts together for producing the desired resiliency between these parts to effectively lock the notch and the keeper wall and hold them together.

The inner edge of the bifurcated portion 17, preferably opposite the notch 20, is formed with an inward extension 22 which restricts the width of the slot 13 to less than that of the diameter of the pintle 16, thereby insuring that the portion b of the pin 11 cannot be withdrawn from the opening 14, but leaving sufficient clearance between the parts 17 and 20 to permit the same to be compressed together to release the notch 18 from the bar 19.

It will be manifest that when the bifurcated portions 17 and 18 are compressed together to release the notch 18 from the keeper wall 19, the piercing end of the pin may be withdrawn from the keeper 12 by a longitudinal sliding movement of the pin in the opening 14, and the pin may be withdrawn from the fabric or other material in which it is inserted and secured by pivoting the pin in the opening 14, this pivotal motion being permitted by the arrangement of the slot 13 and the enlargement 23 at the inner end thereof which permits a shifting of the end portion b with respect to the pintle 16, and further by reason of the relatively narrow width of the wall 19 of the boss 15. By this construction there are no separate and independent moving parts and no special hinge is required between the pin and the body member 10, nor are any separate and independent locking parts employed, the boss or projection 15 being fast or integral with the body 10.

From the foregoing it will be seen that a very economical and simple pin guard or lock has been provided for jewelry, buttons, badges or other similar articles, which is extremely efficient and positively locks the pin in position against accidental displacement, and the pin will be maintained in locking position under severe strain unless the pin 11 is bent so as to shorten its length and remove it from the thimble keeper 12.

Having thus described the invention and the manner in which the same is to be performed, what is claimed as new, is:

1. A pin guard comprising a body member, a mounting on said body having an opening therein, a pin having a bifurcated end slidably and pivotally mounted in said opening and adapted to engage the walls of said keeper in one of its slidable positions to compress said bifurcated parts together, means on at least one of said bifurcated portions to cooperate with said mounting for locking said pin in position when said bifurcated portions are in said compressed condition, and a keeper on the body for the piercing end of the pin adapted to receive and retain the same when the pin is in said locked position, a pintle extending transversely through the said first keeper and into the bifurcation of said pin, said bifurcation being restricted at its entrance to a width less than the diameter of said pin.

2. A pin guard comprising a body member having a rigid part formed with an opening, a pin having one end thereof slidably mounted in said opening, said end of the pin being bifurcated to form a resilient compressible latch member cooperating with said rigid part to lock the pin in one of its slidable positions, a pintle mounted on said part and extending through the bifurcation of said pin to limit the sliding movement of the pin, means restricting the entrance of said bifurcation to a width less than the diameter of said pin, and a keeper for receiving the piercing end of the pin when moved to said locking position.

3. In a pin, a pin-tongue, a rigid mounting for the pin-tongue and a keeper positioned with respect to said mounting to have said pin move into engagement and disengagement therewith, said pin and mounting having complemental means thereon for providing relative pivotal and sliding movement of the tongue.

4. In a pin, a pin-tongue, a rigid mounting for the pin-tongue and a keeper positioned with respect to said mounting to have said pin move into engagement and disengagement therewith, said pin and mounting having complemental means thereon for providing relative pivotal and sliding movement of the tongue, and releasable locking means for holding said pin in engagement, with said keeper.

5. In a pin, a body member, a pin mounting rigidly secured to the body member, a pin-tongue having one end engaging said mounting, said end and said mounting having complemental means for providing relative pivotal and sliding movements of the pin-tongue, and a keeper for the pin-tongue when in one of its slidable positions.

6. In a pin, a body member, a pin mounting rigidly secured to the body member, a pin-tongue having one end engaging said mounting, said end and said mounting having complemental means for providing relative pivotal and sliding movements of the pin-tongue, a keeper for the pin-tongue when in one of its slidable positions, and resilient means between said mounting and tongue for locking the latter in engagement with said keeper.

7. In a pin, a pin-tongue, a mounting in which said pin-tongue is slidably mounted, a keeper for said pin-tongue when in one of its slidable positions, and means for limiting said sliding movements of the tongue so that a sliding and pivotal movement is imparted to said pin-tongue with respect to that portion of the mounting in which said pin-tongue engages by a continued pull applied to the tongue in one direction.

8. In combination, a body member, a mounting rigid on said body member and having an opening therein in which an end of said pin is longitudinally slidably mounted, a keeper for receiving another portion of said pin when in one of its slidable positions, and means for shifting said pin laterally from said body member, when slidably moved from engagement with said keeper, to provide a clearance permitting pivoting of said pin in said mounting, the restricting edges of said mounting being off-set to permit said pivoting movement.

9. In combination, a body member, a mounting rigid on said body member and having an opening therein in which an end of said pin is longitudinally slidably mounted, a keeper for receiving another portion of said pin when in one of its slidable positions, a pintle on said mounting extending across the opening therein and through a slot in said pin oblique to the axis thereof to shift the pin laterally from the body member when moved from engagement with said keeper, said pintle being positioned inwardly of the mounting beyond the inner restricting edge thereof opposite the body member, whereby the pin may be pivoted in the opening of said mounting.

10. In a pin, a pin-tongue, a mounting in which said pin-tongue is slidably mounted, a keeper for said pin-tongue when in one of its slidable positions, and means for limiting said sliding movements of the tongue and forming a fulcrum about which said pin will pivot when continued pull is applied thereto at the end thereof opposite the piercing end thereof.

In testimony whereof I have hereunto set my hand.

THEODORE F. PEITER.